UNITED STATES PATENT OFFICE.

REGINALD GULEY LEWIS AND HENRY BROOKER, OF LONDON, ENGLAND.

DELIVERY MECHANISM FOR COIN-FREED APPARATUS AND THE LIKE.

1,281,602. Specification of Letters Patent. Patented Oct. 15, 1918.

Application filed May 24, 1918. Serial No. 236,322.

*To all whom it may concern:*

Be it known that we, REGINALD GULEY LEWIS and HENRY BROOKER, subjects of His Majesty King George V of the United Kingdom of Great Britain and Ireland and of the British Dominions Beyond the Sea and Emperor of India, residing at London, England, have invented certain new and useful Improvements in Delivery Mechanism for Coin-Freed Apparatus and the like, of which the following is a specification.

The present invention relates to improved delivery mechanism for coin-freed apparatus or the like for delivery of goods, and being particularly applicable to solid articles stored in vertical pile, whether in one pile or several piles, it will be hereinafter described in that application.

The delivery mechanism according to the present invention broadly comprises a duality of slides mounted to move together as a single slide in one or the same direction, also for one to move in, on, or over the other, while the other is stationary, the directions of the two movements lying in different vertical planes, and the first made movement of the two movements registering the device for working the apparatus for delivery by the other movement.

As an example of coin actuated means for releasing the selective movement, we may refer to the mechanism for control of delivery which is described and claimed in our concurrent application Serial No. 236,321. filed of even date herewith and which comprises a straight vertically moving ratcheted stop bar and a coin actuated lever operating on the ratcheted face of the stop bar to lift the stop bar and thereby release an operating slide.

By means of a stepped block associated with the stop bar the amount of movement of the operating slide may be varied in accordance with the lift of the stop bar as described in our aforesaid concurrent application.

Otherwise the stop bar may completely release the selector slide which can then move up to a stop which allows this slide to register for delivery from the first of a number of side by side piles of similar kind and value, further stops moving one by one into the path of the selector slide as the piles are exhausted, these further stops being connected with feelers each under the preceding pile so that as the first pile is emptied, the second stop drops into position alongside the first stop and so on.

Alternatively the stop bar may completely release the selector slide as in the preceding case, and the stops arranged to be manually moved into the path of the selector slide according from which pile it is desired to register this slide for delivery.

In combination with the multiple coin mechanism of our concurrent application above referred to the delivery mechanism according to the present invention is also suited for delivery from a single pile on the insertion of coins of varying number but of the same aggregate value. In this case the selector slide has a certain movement each and every time to register it for delivery from the pile.

It is not essential to provide the step or the series of stops on the selector bar or operating slide itself. An equivalent would be the provision of the step or steps on the climb-up stop device, the step rises then being horizontal instead of vertical.

A construction of machine under the present invention for delivering goods stored in several vertical piles is illustrated in the appended sheets of drawings in which:—

Fig. 2 is a side elevation, Fig. 3 a plan of the selective operating device or delivery slide, Fig. 4 a similar view to Fig. 3, but showing a modification giving a positive action of the selector bar in either direction of its movement.

In a machine as depicted having a number of piles, $a$, $a'$, etc., of goods differing in value arranged side by side in a plane parallel to the front of the machine, each pile $a$, $a'$, etc., is arranged to rest partly or wholly on a slide having an upstanding edge adapted to put out one article in well known manner when the slide is moved forward through the mediation of a lever $c$ pivoted on the frame of the machine, the lower ends of these levers $c$, $c'$, etc., being arranged conveniently side by side at equal distance from one another in a plane parallel to the front of the machine.

In the illustrated form of the delivery mechanism, a selector bar $d$ with rack $d'$ is adapted to slide in a line or direction parallel to the front of the machine, and when freed is adapted to be actuated by a pinion $e$ itself actuated by a rack $f$ through a companion pinion $e'$. The rack $f$ is free to slide in a direction at right angles to the selector bar, the rack $f$ and the selector bar $d$ lying in parallel horizontal planes and the rack $f$ being integral with a stem $g$ which passes through the front of the machine and carries on the projecting end a knob or handle $h$ accessible to the purchaser.

A slide or carriage $i$ supported and free to slide on rods $j$, $j'$ in a direction normal to the front of the machine carries the selector bar $d$, the pinion $e$, and the actuating rack $f$.

On the selector bar $d$ is a stop or catch $k$ which registers with one or other of the slide levers $c$, $c'$, etc., above mentioned according to the distance the selector bar $d$ is freed by the stop-bar $l$ to travel in its own direction before moving forward with the slide or carriage $i$.

Figure 1:
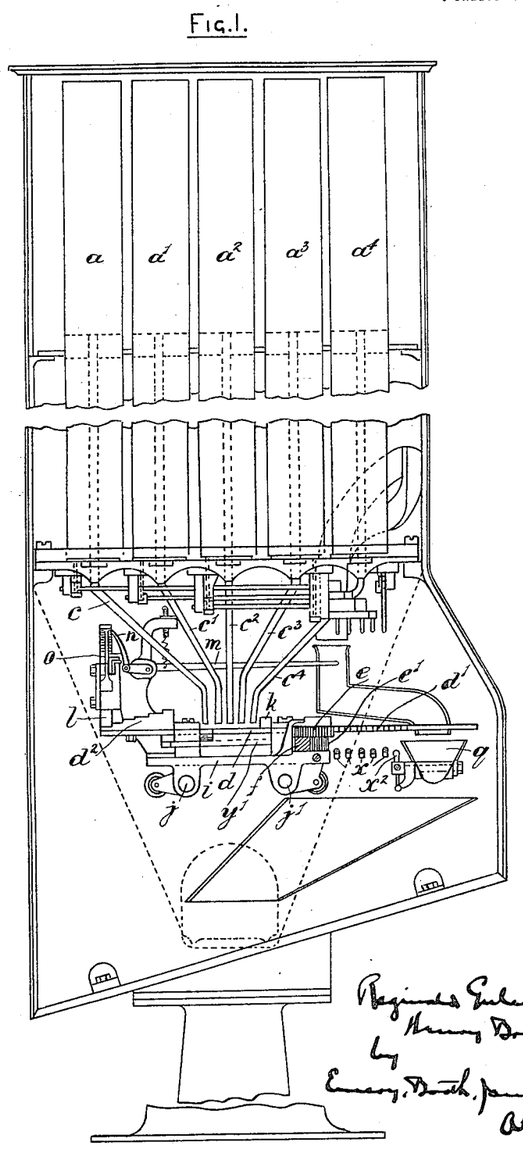
Figure 1 is a front elevation of the interior of a coin-freed apparatus embodying delivery mechanism constructed according to this invention.
Figure 2:
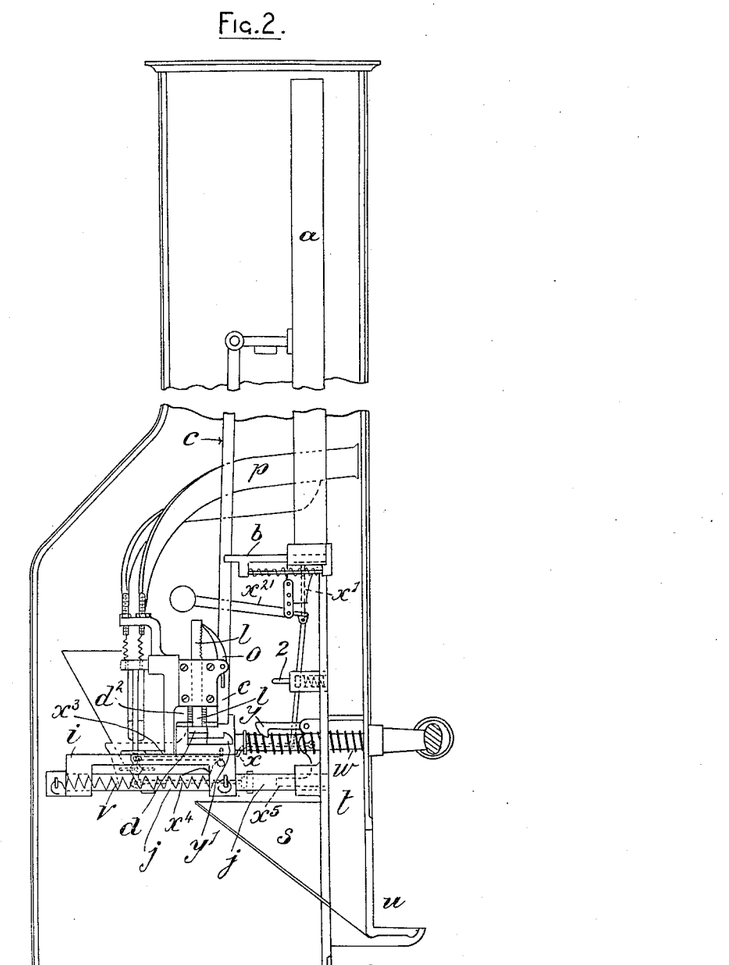
Figure 3:
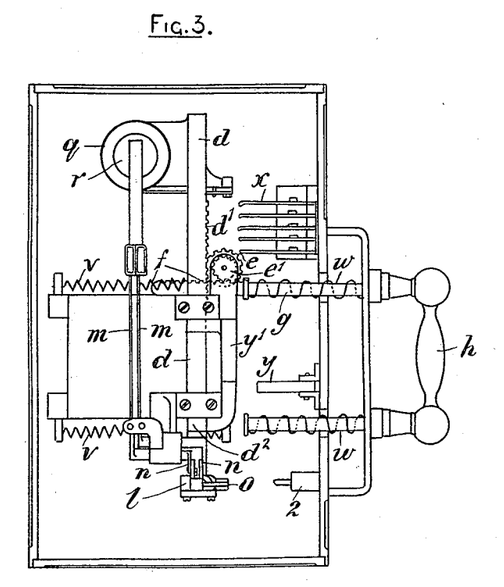
Figure 4:
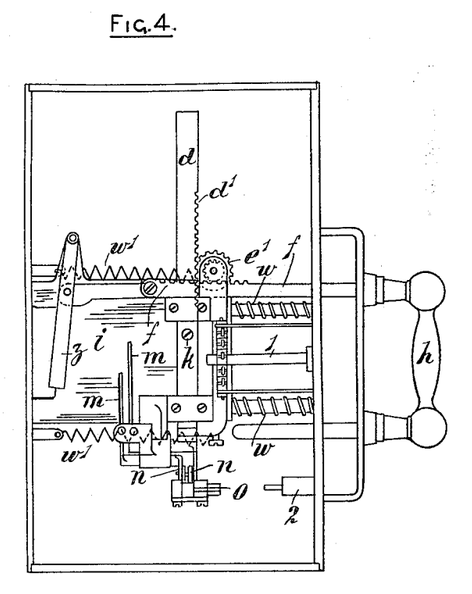

$l$ designates the straight vertically set ratcheted stop bar which is operatable as described in our concurrent application above referred to by a series of levers $m$, $m$ and clicks $n$, $n$, the stop-bar $l$ being arranged free to slide in a vertical direction, and with its associated parts in the embodiment shown by Figs. 1 to 3, also Fig. 4, being mounted on the slide or carriage $i$ to move therewith. The coin-actuated levers, $m$, $m$, for operating the stop-bar $l$ are pivoted on an upstanding portion of the slide or carriage $i$ and have pawls $n$, $n$ engaging a ratcheted face of the stop-bar $l$, a detent or locking pawl $o$ being arranged to retain the stop-bar $l$ at any height to which it may be lifted. The stop bar $l$ with its actuating mechanism we designate hereinafter as master selector mechanism.

The coin runway $p$, illustrated as arranged to separate pence from halfpence by side tipping or by other known or approved methods delivers pence to actuate one of the levers above described and lift the stop-bar an apportioned distance, for instance, two teeth for each coin passing; and halfpence to actuate another lever lifting the stop-bar a lesser distance, for instance one tooth for each coin passing, so that whether one penny be inserted, or two halfpence, the stop-bar will be lifted two teeth as a result.

The selector bar $d$ is stepped at the stop bar end $d^2$ to engage with the stop-bar $l$; the particular step engaged being determined by the height to which the stop-bar $l$ has been lifted.

On the selector bar $d$ may be fixed a money-hopper $q$ having a valve or tilting bottom $r$ in the bottom arranged to be tilted by appropriate device one way or the other according as there are articles present in the vertical compartment selected or the compartment is empty. If articles are present the money is directed into a cash drawer, otherwise the money passes into a shoot $s$ arranged to conduct money tilted into it, to an opening in the front of the machine accessible to the purchaser; another shoot $t$ being arranged to conduct any article put out from a pile to the same opening $u$ in the front of the machine accessible to the purchaser.

*Action of the delivery mechanism.*

The stop bar $l$ having been lifted the purchaser pulls the handle $h$ provided and actuates the rack $f$ and pinions $e$, $e'$ to move the selector bar against the influence of a spring or equivalent $v$, $v$ in a direction parallel to the front of the machine until the step face appertaining to said valve engages with the stop-bar $l$ and locks the selector bar $d$ against further movement in its own direction. Continuing to pull the handle $h$, the purchaser now pulls the whole slide or carriage $i$ forward against the influence of a stronger spring or equivalent $w$, $w$, and during this movement, the catch or stop $k$ on the selector bar $d$ engages the lever $c$ or $c'$, etc., corresponding to the pile of articles selected whereby as the whole is continued to be pulled forward an article is put out and falls down to the opening. After actuating the levers $m$, etc., the coins first fall into the money hopper $q$ which is on the selector bar $d$ and moves therewith to travel along behind a number of tilting catches $x$ spaced equally with the main levers $c$, etc., so that, when the selector bar $d$ is stopped by the stop-bar $l$ engaging one of the step faces, the tilting lever $x^2$ of the money hopper stops opposite the tilting catch $x$ corresponding to the pile of articles selected. When the carriage is drawn forward the tilting catch $x$ actuates the tilting lever $x^2$ through the rod $x^3$ so as to direct the money into the cash drawer. Should the tilting catch $x$ in question have been withdrawn owing to the absence of articles in that compartment allowing a feeler $x'$ connected thereto to rise under the influence of a weight (the weighted lever $x^{21}$ for example) the money is not directed into the cash drawer, but is discharged into a put-out by which it is conveyed by gravitation to the front of the machine and returned to the purchaser. The put-out or money-back discharged is done by a rod $x^4$ which is connected to the other arm of the tilting lever $x^2$ of the money hopper and is adapted when the tilting catch is withdrawn to make contact with a stop $x^5$ and tilt the bottom of the money hopper in the reverse direction.

Near its farthest forward position, it may be expedient to lock the slide or carriage $i$ against return under the action of its spring or equivalent control $w$ until the selector bar $d$ has returned to normal position under the action of its own spring $v$. For example, a hooked catch $y$ pivotally mounted on the frame of the machine may be adapted to hook over a hook bar $y'$ on the selector bar $d$ and this hook bar $y'$ may be so gapped as to free itself from the hooked catch $y$ when the selector bar $d$ returns to normal position.

Figure 5:
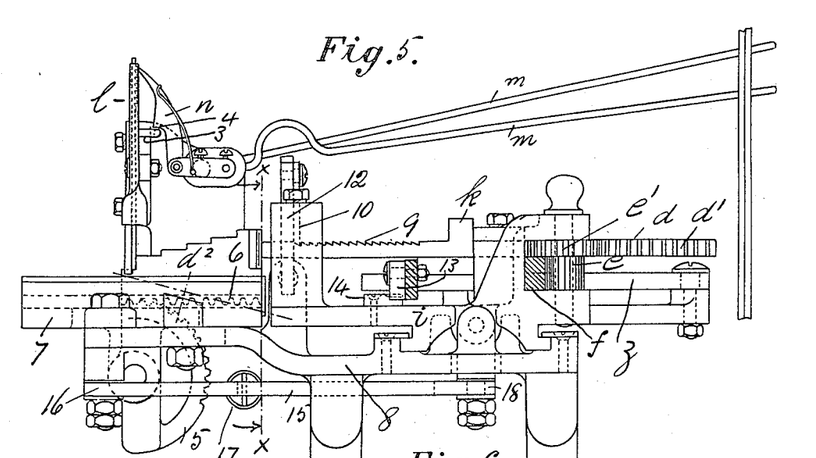
Figs. 5 and 6 are front and part plan views respectively of a modified selective operating device, Fig. 7 a section on line *x—x*, Fig. 5.
Figure 6:
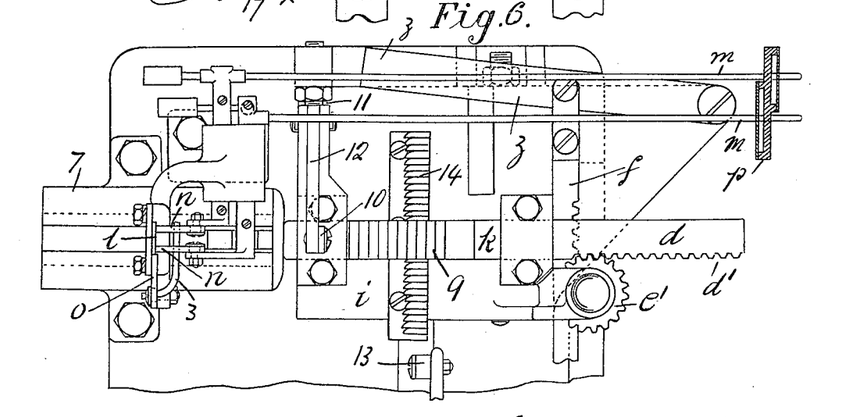
Figure 7:
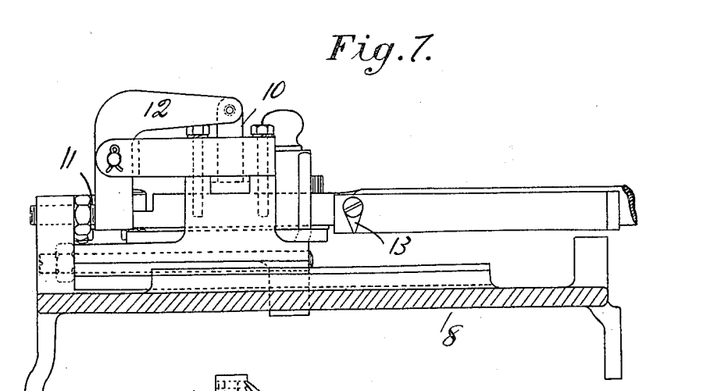
Figure 8:
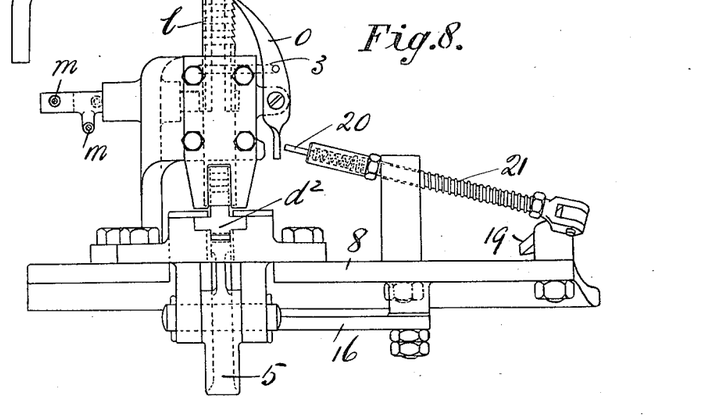
Fig. 8 is a side elevation of a tripping device for the stop-bar pawl which tripping device is actuated by the delivery slide.

The detent pawl $o$ and coin lever pawls $n, n$ are arranged to be disengaged in any appropriate manner to allow the stop bar $l$ to drop back to normal position. For example 2 designates a touch piece for pressing against a tail piece of the pawl $o$ for withdrawal of the pawl by the operation of the delivery slide. Simultaneously the pawls $n, n$ are withdrawn by the lifting motion of the finger 3 which is fixed to the pawl $o$ and passes under projections 4 of the pawls $n, n$ as shown in Figs. 5, 6 and 8.

As an alternative and positive way of returning the selector bar $d$ to normal position after the apparatus has been selectively operated for delivery, the modified device illustrated in Fig. 4 may be adopted.

According to this arrangement any spring action for returning the selector bar $d$ is suppressed in favor of a positive action which constrains the companion pinion $e'$ of the selector rack $d'$ to roll up on its appertaining rack while the slide or carriage $i$ continues to advance after operating the apparatus for delivery.

In this view the pull out rack $f$ is linked to a lever $z$ pivoted at one end to the slide or carriage $i$, and in the path of the other end of the lever $z$ is interposed a stop which may be the free end of a fixed rod 1. The rod 1 is arranged to enter clear between the slide or carriage $i$ and the selector bar $d$ as the slide or carriage $i$ advances.

On a pull-out of the handle stem $g$ the springs $w, w$ and $w', w'$ or, the springs $w, w$ being suppressed, the springs $w', w'$ oppose the advance of the slide or carriage $i$ until the selector bar $d$ is advanced by the cross rack action up to the stop bar $l$. Thereafter the slide or carriage together with the now advanced selector bar advances to selectively operate the apparatus for delivery after which the free end of linked lever $z$ makes contact with the stop $l$, whereby during the completion of the advancing movement of the slide or carriage $i$ a roll up of the pinion $e'$ on the pull out rack $f$ serves to positively return to normal or re-set position the selector bar $d$ through the mediation of the pinion $e$ and its associated rack $d'$.

Other coöperating means connecting the two slides will suggest themselves whereby a first movement of one slide only up to its stop is followed by a second movement of both as a single slide, said coöperating means being capable of returning, and being combined with means constraining the returning of the independently movable slide to zero position by movement positive with or dependent on the uni-directional movement of both slides, and therefore we wish it understood that we do not limit ourselves in this respect.

If it is not desired to have the stepped portion $d^2$ of the selector bar, also the coin levers $m, m$ and their associated parts, movable with the delivery slide; this involving division of the coin runways, with parts to move with the levers $m, m$ as in the embodiments so far described, the arrangement illustrated by Figs. 5 and 6 serves well. In the arrangement according to Figs. 5 to 8 the stepped portion $d^2$ and the selector bar $d$ are made separate from each other, the selector bar $d$ acting as a pusher in relation to the stepped portion $d^2$ which is adapted to be returned to normal position by its own weight or spring, for example by the weighted toothed segment 5, this meshing with a short rack 6 on the under face of the stepped block $d^2$. The block $d^2$ slides in a suitable bed 7 which with the stop bar $o$, levers $m, m$ and coin runway $p$ are mounted on the fixed base 8 on which the delivery slide moves forward to effect a delivery.

Control of the block $d^2$ by the stop bar $l$ is as already described. But there must be means to prevent the selector bar $d$ having any further movement than that allowed by the block $d^2$ when, in the forward movement of the delivery slide, it passes beyond the block $d^2$. As convenient means for this purpose, the selector bar $d$ is ratcheted on its upper face 9 and the delivery slide carries a pawl 10: which pawl 10 is withdrawn by the fixed stop 11 acting through the bell crank 12 when the delivery slide is at zero position, but falls and locks the ratcheted selector bar $d$ against further forward movement in its own lengthwise direction as soon as the delivery slide moves forward.

The ratcheting 9 allows the selector bar $d$ to be returned to zero position through the mediation of the linked lever $z$ and stop $l$ in the manner already described without requiring that special provision for lifting the locking pawl 10 which the use of a rack would involve.

13 is a non-traveling pawl under which works a ratchet 14 on the delivery slide which is thereby prevented against returning to zero position until the delivery stroke is completed; when the ratchet 14 has cleared the pawl 13 which then trails over the ratchet 14 in the return movement of the delivery slide.

The delivery slide or carriage $i$ travels in a slide guide in the base 8, and return to zero position is by a lever 15 hinging at 16 against a spiral tension spring 17 and connected at 18 to the carriage $i$, the connection working in a slot in the base 8.

Inasmuch as the stop bar $l$ and pawl $o$ do not move forward with the carriage, appropriate means are provided for withdrawing the pawl $o$ and pawls $n, n$ by the operation of the carriage. In Fig. 8 is illustrated how this may conveniently be done by a rock-piece 19 against which a part on the carriage is brought to impel a yielding touch piece 20 at the free end of a spring controller rod 21 hinged to the rock-piece 19.

What we claim is:—

1. In coin freed apparatus, delivery mechanism comprising a duality of slides mounted to move together as a single slide in one or the same direction also for one to move in, on, or over the other while the other is stationary, the directions of the two movements lying in different vertical planes, and the first made movement of the two movements registering the device for working the apparatus for delivery by the other movement.

2. In coin freed apparatus, delivery mechanism consisting of a duality of slides one of which is endwise movable in, on, or over the other in a direction lying in a different vertical plane to the direction of movement of the duality, one movement registering or being selective for registering the device for working the apparatus for delivery by the other movement, means for controlling the registering or selective movement, means mounted on one slide for advancing the other, means acting through said advancing means for moving the two slides as a unit, and means so opposing the delivery movement that the selective movement must be made before the apparatus is worked for delivery by the delivery movement.

3. Delivery slide comprising a duality of slides mounted to move together as a single slide in one or the same direction, also for one to move in relation to the other, while the other is stationary, the directions of the two movements lying in different vertical planes, with the first made movement of the two movements registering the delivery slide for working the apparatus for delivery by the other movement, a stop, coöperating means connecting the two slides and means opposing the movement of both as a single slide whereby a first movement of one slide only up to said stop is followed by a second movement of both as a single slide, said coöperating connecting means being capable of returning and being combined with means constraining the returning of the independently movable slide to zero position by movement positive with or dependent on the uni-directional movement of both slides.

4. In coin freed apparatus, in combination, stop means, an ejecting mechanism, an operating member and means controlled by said operating member to move in one direction until it is arrested by the stop means, and to then move in another direction to actuate said ejecting mechanism.

5. In coin freed apparatus, in combination, an ejecting mechanism, a stop means, an operating member, operable by a single manual movement, an element movable thereby until it is arrested by said stop means, and means for thereupon causing said element to move in a different direction to actuate said ejecting mechanism.

6. In a coin freed apparatus, in combination, an ejecting mechanism, a stop means, an operating member, operable by a single manual movement, two elements successively movable by said operating member, one until it is arrested by said stop, and the other to bring about actuation of said ejecting mechanism.

7. In coin freed apparatus, in combination, a delivery mechanism, comprising an operating member, a selector member movable thereby in one direction for registry with the desired commodity, a carriage for said member thereupon movable in another direction and ejecting mechanism thereupon actuated by said latter movement.

8. In coin freed apparatus, in combination, a delivery mechanism comprising a selector member and a carriage for said selector member, means for moving said member with respect to said carriage to a limiting position in order to effect registry with the desired commodity, and for thereupon moving said carriage together with the selector member, in another direction, and ejecting mechanism actuated by said last movement.

9. In coin freed apparatus, in combination, a delivery mechanism comprising, an operating member, a selector member, a carriage for said selector member, an ejecting mechanism, and means for converting a simple mechanical movement of said operating member, to move said selector member with respect to said carriage for registry with the desired commodity, to then move said carriage and said selector as a unit, in another direction, and to thereby actuate said ejecting mechanism.

10. In coin freed apparatus, in combination, a delivery mechanism, comprising an operating member actuable by a single simple manual movement, a carriage connected to said operating member, means for delaying movement of said carriage, a selector member associated with said carriage, a mechanical movement for urging said selector at an angle to the movement of said operating means to a limiting position, means for thereupon moving said carriage and selector member as a unit, and an ejecting mechanism actuated by said latter movement.

11. In coin freed apparatus, in combination, a delivery mechanism comprising an operating plunger actuable by a single longitudinal movement, a rack connected to said plunger, a pinion coacting therewith, a cross rack connected to said pinion, a selector member substantially rigid with said crossrack, a carriage connected with said plunger, and constituting a support for said selector member, means for delaying the movement of said carriage until said selector member has performed its function, and an ejecting mechanism actuated by the movement of said carriage.

12. In coin freed apparatus, in combination, a delivery mechanism, comprising an operating plunger actuable by a single longitudinal movement, a rack rigid with said plunger, a pinion coacting therewith, a cross rack at right angles to said first rack, means for driving said cross rack from said pinion, a selector member coöperating with said cross rack, a carriage connected to move in the same direction as said plunger, a spring for delaying the movement of said carriage until said selector has completed its motion, and an ejecting mechanism actuated by the movement of said carriage.

13. In coin freed apparatus, in combination, an ejecting mechanism, a master selector mechanism, a member whose position is limited by said latter mechanism for registry with the desired commodity, and means for thereupon moving said member with respect to said master mechanism, to actuate said ejecting mechanism.

14. In coin freed apparatus, in combination, an operating member, actuable by a single simple manual movement, an ejecting mechanism, a master selector mechanism set for proper delivery, a selector member movable by said operating member substantially in the direction of its length until arrested by said mechanism, and then movable at substantially right angles to its length, to actuate said ejecting mechanism.

15. In coin freed apparatus, in combination, a stop member set for selection of the desired commodity, a delivery mechanism comprising a selector block having irregularities to limit its position according to the setting of said stop member, a selector bar, means for moving said selector bar against said block, until said block is arrested by said stop member, and means for thereupon moving said bar at an angle to said block to effect release of the selected commodity.

16. In coin freed apparatus, in combination, a stop member, set for selection of the desired commodity, a delivery mechanism comprising a stepped selection block whose steps are adapted to coöperate with said stop member, a selector bar, means for moving said selector bar against said block, until a step of said block is arrested by said stop, means for thereupon moving said bar with respect to said block to effect release of the selected commodity, and means for then causing said selector block to automatically return to initial position.

17. In coin freed apparatus, in combination, a stop member, set for selection of the desired commodity, a delivery mechanism comprising a stepped selection block whose steps are adapted to coöperate with said stop member, a selector bar, means for moving said selector bar against said block, until a step of said block is arrested by said stop, means for thereupon moving said bar with respect to said block to effect release of the selected commodity, and means to maintain said bar after said movement away from said stop in the relation to which it has been set by said stop.

18. In coin freed apparatus, in combination, an ejecting mechanism, a master selector mechanism, a member whose position is limited by said latter mechanism, for registry with the desired commodity, means for thereupon moving said member with respect to said master mechanism to actuate said ejecting mechanism, and means for maintaining said member in the relation to which it has been set by said master mechanism until after said ejecting mechanism has been actuated.

19. In coin freed apparatus, in combination, an ejecting mechanism, a master selector mechanism, an operating member, actuable by a single, simple, manual movement, a member movable thereby to a position limited by said master mechanism, a carriage for said member, means for permitting said operating member thereupon to move said carriage and said member as a unit with respect to said master mechanism, and in a direction at an angle to said first movement to actuate said ejecting mechanism.

20. In apparatus of the character described, in combination, an ejecting mechanism, a selector member, an operating member actuable by a single, simple manual movement, means under the control of said operating member for actuating said ejecting mechanism and for thereupon positively returning said selector member to inoperative position.

21. In apparatus of the character described, in combination, an ejecting mechanism, a selector member, an operating member, actuable by a single, simple manual movement, means controlled by said operating member for moving said selector member to a limiting selecting position, for then actuating said ejecting mechanism, and for thereupon positively returning said selector member to inoperative position, during said simple, manual movement.

22. In apparatus of the character described, in combination, an ejecting mechanism, a slide for actuating the same, a selector member, an operating plunger operable by a single longitudinal movement, a cross-rack and pinion movement between said slide and said member, and means constraining the pinion of said slide to roll up on its rack, thereby said selector member is returned to initial position by a movement positive with and completely dependent on the movement of said plunger.

23. In coin freed apparatus, in combination, a stop member, set for selection of the desired commodity, a delivery mechanism, comprising a stepped selection block, whose steps are adapted to coöperate with said stop member, a selector bar, a carriage therefor, an operating member actuable by a single, simple, manual movement, a mechanical movement connecting said operating member to said selector bar and its carriage, to move said selector bar against said block until a step thereof is arrested by said stop, and to thereupon move said carriage and said bar as a unit at right angles to said first movement, to effect release of the selected commodity.

In testimony whereof, we affix our signatures.

REGINALD GULEY LEWIS.
HENRY BROOKER.

Copies of this patent may be obtained for five cents each, by addressing the "Commissioner of Patents, Washington, D. C."